(12) United States Patent
Katayama

(10) Patent No.: US 6,531,534 B1
(45) Date of Patent: Mar. 11, 2003

(54) THERMOPLASTIC RESIN COMPOSITION

(75) Inventor: Masahiro Katayama, Osaka (JP)

(73) Assignee: Daicel Chemical Industries, Ltd., Sakai (JP)

( * ) Notice: Subject to any disclaimer, the term of this patent is extended or adjusted under 35 U.S.C. 154(b) by 0 days.

(21) Appl. No.: 09/673,560

(22) PCT Filed: Feb. 18, 2000

(86) PCT No.: PCT/JP00/00417

§ 371 (c)(1),
(2), (4) Date: Oct. 13, 2000

(87) PCT Pub. No.: WO00/46298

PCT Pub. Date: Aug. 10, 2000

(30) Foreign Application Priority Data

Feb. 4, 1999 (JP) ............................................. 11-027530

(51) Int. Cl.[7] ................................................. C08K 3/34
(52) U.S. Cl. ....................................... 524/451; 524/145
(58) Field of Search .................................. 524/145, 451

(56) References Cited

FOREIGN PATENT DOCUMENTS

| | | |
|---|---|---|
| EP | 0 483 628 A2 | 5/1992 |
| EP | 0 980 896 A1 | 2/2000 |
| JP | 48-43449 | 6/1973 |
| JP | 7-316411 | 12/1995 |
| JP | 9-279006 | 10/1997 |
| JP | 11-199768 | 7/1999 |
| JP | 11-246721 | 9/1999 |
| JP | 2000-72962 | 3/2000 |
| JP | 2000-103952 | 4/2000 |

*Primary Examiner*—Edward J. Cain
(74) *Attorney, Agent, or Firm*—Flynn, Thiel, Boutell & Tanis, P.C.

(57) ABSTRACT

The present invention provides a thermoplastic resin composition which has a high resistance to hydrolysis in a molded article thereof. That is, it provides a thermoplastic resin composition which contains 100 parts by weight of (a) a polycarbonate resin or, if necessary, a mixture of (a) with (b) a styrene resin, 1 to 40 parts by weight of (c) an organic phosphorus compound and 0.1 to 5 parts by weight of (e) talc, and further contains 0.05 to 5 parts by weight of (d) fluoroethylene polymer if necessary.

8 Claims, No Drawings

THERMOPLASTIC RESIN COMPOSITION

FIELD OF THE INVENTION

The present invention relates to a thermoplastic resin composition that is useful as a material for parts of OA equipment, communication equipment, housing for electric appliances, chassis and the like, and materials for parts of automobiles.

PRIOR ART

Hitherto, a polymer blend of a polycarbonate resin and a styrene resin has been widely used in automobiles, OA equipment, electronic and electric fields, and the like. However, the polycarbonate resin is poor in resistance against hydrolysis. Thus, in the case that various products composed of the above-mentioned polymer blend are used or allowed to stand under a high temperature and high humidity for a long time, there arises a problem that their strength drops.

Since flame resistance is required for OA equipment, electric appliances and the like, various kinds of flame retardants are blended in the base resin thereof. Conventionally, a halogen flame retardant such as bromine or chlorine is widely used as the flame retardant. However, there remains a problem that a corrosive gas is generated at the time of processing or burning. Therefore, research and development on organic phosphorus compounds are being made as a flame retardant in place of the halogen flame retardant. However, the organic phosphorus compounds also function as plasticizers so as to make the thermal deformation temperature very low. Thus, there arises a problem that uses of the resin composition are restricted.

DISCLOSURE OF THE INVENTION

An object of the present invention is to provide a thermoplastic resin composition which makes it possible to improve the resistance against hydrolysis of a molded article obtained from a composition comprising, as a base resin, a polymer blend of a polycarbonate resin and a styrene resin, and decrease the amount of an organic phosphorus compound blended without any drop in flame resistance.

The present invention is a thermoplastic resin composition comprising 100 parts by weight of (a) a polycarbonate resin, 1 to 40 parts by weight of (c) an organic phosphorus compound and 0.1 to 5 parts by weight of (e) talc. Preferably, a mixture of 30 to 95% by weight of (a) a polycarbonate resin and 5 to 70% by weight of (b) a styrene resin may be used in place of the above-mentioned component (a).

The composition of the invention preferably comprises 100 parts by weight of a mixture of 30 to 95% by weight of (a) a polycarbonate resin and 5 to 70% by weight of (b) a styrene resin, 1 to 40 parts by weight of (c) an organic phosphorus compound and 0.1 to 5 parts by weight of (e) talc, and further comprises 0.05 to 5 parts by weight of a polymer of (d) a fluoroethylene.

Further, it optionally comprises 0.1 to 20 parts by weight of (f) an anti-impact improver.

It is preferable that (f) the anti-impact improver is at least one copolymer selected from the group consisting of (f-1) to (f-4) below defined:

(f-1) a copolymer of an aromatic vinyl compound and a conjugated diene compound or a hydrogenated product of the copolymer;

(f-2) an epoxydized product of a copolymer of an aromatic vinyl compound and a conjugated diene compound or a hydrogenated product of the epoxydized product;

(f-3) a copolymer of an aromatic vinyl compound and a monomer polymerizable with the aromatic vinyl compound; and (f-4) a graft copolymer obtained by graft-polymerizing an aromatic vinyl compound and a monomer polymerizable with the aromatic vinyl compound on the body of a rubbery polymer having a glass transition point of −30° C. or lower.

In a preferred embodiment of the present invention, the anti-impact improver (f) comprises (f-3) and (f-4), the monomer polymerizable with the aromatic vinyl compound is a (meth)acrylic ester monomer; and (f-3) is a graft copolymer. Specifically, (f-3) is a graft copolymer of an aromatic vinyl compound and a (meth)acrylic ester monomer and contains 50% by weight or less of the (meth)acrylic ester monomer in terms of starting monomers. More specifically, (f-3) is a copolymer of methyl methacrylate and styrene and (f-4) is a graft copolymer of methyl methacrylate, styrene and butadiene.

Further, the composition of the present invention optionally comprises 0.1 to 20 parts by weight of (g) polyphenylene ether resin.

The present invention is a molded article of the above-mentioned composition, which has an excellent resistance to hydrolysis. The number-average molecular weight of the component (a) is reduced by 0 to 20% when the molded article has been allowed to stand in an atmosphere of 40° C. and 90%RH for 1000 hr.

The thermoplastic resin compositions of the present invention can be classified into a three-component type composition comprising (a) a polycarbonate resin, (c) an organic phosphorus compound and (e) talc, and a five-component type composition comprising (a) a polycarbonate resin, (b) a styrene resin, (c) an organic phosphorus compound, (d) a fluoroethylene polymer and (e) talc. Since the components contained in these compositions overlap with each other, the following will describe the five-component type composition comprising a larger number of the components, thereby describing the three-component type composition.

DETAILED DESCRIPTION OF THE INVENTION

The polycarbonate resin of the component (a) used in the present invention can be obtained by reacting a bivalent phenol with a carbonate precursor in the known solution or melting method.

The bivalent phenol may be one or more selected from 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 2,2-bis(4-hydroxy-3,5-dibromophenyl)propane, 2,2-bis(4-hydroxy-3-methylphenyl)propane, bis(4-hydroxyphenyl)sulfide, bis(4-hydroxyphenyl)sulfone and the like. Among these, bis(4-hydroxyphenyl)alkanes are preferable. Bisphenol A is especially preferable.

The carbonate precursor may be one or more selected from a diarylcarbonate such as diphenylcarbonate; dialkylcarbonate such as dimethylcarbonate and diethylcarbonate; carbonyl halide such as phosgene; haloformate such as a dihaloformate of a bivalent phenol; and the like.

The number-average molecular weight of the polycarbonate resin (a) is not especially limited. In order to give practically-required mechanical strength to the molded article obtained from the composition, it is preferably in the range of from about 17000 to 32000.

The styrene resin (b) used in the present invention may be any one of (b-1) a rubber-unmodified styrene resin containing no rubber, and (b-2) a rubber-modified styrene resin.

The component (b-1) may be a homopolymer or a copolymer of one or more selected from aromatic vinyl monomers; or a copolymer of an aromatic vinyl monomer and a non-styrene vinyl monomer which can be copolymerized with it.

Examples of the aromatic vinyl monomer include styrene monomers such as styrene, alkyl-substituted styrene (for example, o-methylstyrene, p-methylstyrene, m-methylstyrene, 2,4-dimethylstyrene and p-tert-butylstyrene), and -alkyl-substituted styrene (for example, -methylstyrene and -methyl-p-methylstyrene). Among these, styrene, p-methylstyrene and -methylstyrene are preferable, and styrene and -methylstyrene are particularly preferable.

Examples of the non-styrene vinyl monomer which can be copolymerized with the aromatic vinyl monomer include cyanovinyl monomers (for example, acrylonitrile and methacrylonitrile), (meth)acryl monomers (for example, an alkyl(meth)acrylate having 1 to 10 carbon atoms, such as methyl methacrylate, ethyl acrylate and butyl acrylate; (meth)acrylic esters having a functional group, such as 2-hydroxyethyl methacrylate and 2-hydroxypropyl methacrylate), maleic anhydride, and N-substituted maleimide. Among these, acrylonitrile, methacrylonitrile, (meth) acrylic esters having 1 to 4 carbon atoms, maleic anhydride, and N-substituted maleimide are preferable. Acrylonitrile and methyl methacrylate are especially preferable.

Examples of the blend ratio of the respective monomers in the case that the component (b-1) is a copolymer are as follows. The aromatic vinyl monomer: 50 to 90% by weight, preferably 55 to 85% by weight, and more preferably 60 to 80% by weight. The cyanovinyl monomer: 10 to 40% by weight, preferably 15 to 30% by weight, and more preferably 20 to 30% by weight. Other monomers such as (meth) acrylic acid monomer: 0 to 40% by weight, preferably 0 to 30% by weight, and more preferably 0 to 20% by weight.

The component (b-2) may be any one of a mixture of a rubber component and a styrene resin, and a graft copolymer of a rubber component and a styrene resin.

The rubber component may be one or more selected from non-styrene rubber polymers containing no styrene unit, such as butadiene rubber, butadiene-isoprene rubber, a butadiene-acrylonitrile copolymer, ethylene-propylene rubber, EPDM (ethylene-propylene-nonconjugated diene rubber), isoprene rubber, chloroprene rubber, acryl rubber, an ethylene-vinyl acetate copolymer; and styrene rubber polymers containing a styrene unit, such as a styrene-butadiene copolymer and a styrene-butadiene block copolymer. Among these, butadiene rubber, a butadiene-acrylonitrile copolymer, ethylene-propylene rubber, EPDM, acryl rubber, a styrene-butadiene copolymer, and a styrene-butadiene block copolymer are preferable. Butadiene rubber and styrene-butadiene copolymer are especially preferable.

The glass transition temperature (Tg) of the rubber component is preferably 0° C. or less, more preferably –150 to 0° C., and most preferably –100 to –10° C. When the Tg is 0° C. or lower, it is possible to prevent a drop in impact strength of the molded article.

The average particle diameter of the rubber component is preferably 0.05 to 5 μm, more preferably 0.1 to 3 μm, and further preferably 0.1 to 1 μm. When the average particle diameter is 0.05 μm or above, it is possible to prevent a drop in impact strength of the molded article. When the average particle diameter is 5 μm or less, it is possible to prevent a drop in the gloss and the surface appearance of the molded article. As the rubber component having such an average particle diameter, there may be used a rubber component having 2 or 3 peaks in its particle distribution, for example, two rubber particle groups having average particle diameters of two different ranges.

As the styrene resin, a resin made from the same monomer as for the component (b-1) mentioned above may be used.

The ratio of weight ratio of the rubber component to the styrene resin component in the rubber-modified styrene resin (the rubber component/the styrene resin component; weight ratio) is preferably 5 to 65/35 to 95, more preferably 10 to 60/40 to 90, further preferably 10 to 65/35 to 90, and especially preferably 15 to 50/50 to 80, in order to improve the impact-resistance.

As the rubber-modified styrene resin, impact-resistant polystyrene (HIPS), wherein polybutadiene is copolymerized with styrene; ABS resin, wherein polybutadiene is copolymerized with acrylonitrile and styrene; AAS resin, wherein acrylic rubber is copolymerized with acrylonitrile and styrene; ACS resin, wherein polyethylene chloride is copolymerized with acrylonitrile and styrene; AES resin, wherein EPDM is copolymerized with acrylonitrile and styrene; a terpolymer wherein an ethylene-vinyl acetate copolymer is copolymerized with acrylonitrile and styrene; MBS resin, wherein polybutadiene is copolymerized with methyl methacrylate and styrene; or the like may be used.

The mixture component (b) is preferably the component (b-2) alone or a mixture of the component (b-1) and the component (b-2).

The ratio (weight ratio) of the component (b-1) to the component (b-2) in the case that the component (b) is a mixture is preferably 0 to 75/25 to 100, more preferably 0 to 60/40 to 100, further preferably 0 to 50/50 to 100, and especially preferably 10 to 40/60 to 90, to improve the impact strength of the molded article.

The content of the rubber component in the case that the component (b) is a mixture of the component (b-1) and the component (b-2) is preferably 1 to 50% by weight, more preferably 5 to 40% by weight and further preferably 10 to 30% by weight. When the content is 1% by weight or more, it is possible to prevent a drop in the impact strength. When the content is 50% by weight or less, it is possible to prevent a drop in melting fluidity, and further prevent gelatinization and discoloring in the step of molding.

The content of the component (a) is 30 to 95% by weight, preferably 50 to 90% by weight and further preferably 60 to 80% by weight. The content of the component (b) is 5 to 70% by weight, preferably 10 to 50% by weight and further preferably 20 to 40% by weight. When the content of the component (a) is 30% by weight or above, it is possible to prevent a drop in thermal deformation temperature. When the content of the component (a) is 95% by weight or less, it is possible to prevent a drop in molding workability.

As the organic phosphorus compound (c) used in the present invention, the compound having one or more esterified oxygen atoms bonded to a phosphorus atom is preferable, in order to improve flame resistance and impact strength.

The component (c) may be one or more selected from phosphoric esters such as trimethyl phosphate, triethyl phosphate, tributyl phosphate, tri(2-ethylhexy)phosphate, tributoxyethyl phosphate, trioleyl phosphate, triphenyl phosphate, tricresyl phosphate, trixylenyl phosphate, tris(isopropylphenyl) phosphate, tris(o-phenylphenyl) phosphate, tris(p-phenylphenyl)phosphate, trinaphthyl phosphate, cresyldiphenyl phosphate, xylenyldiphenyl phosphate, diphenyl (2-ethylhexyl) phosphate, di(isopropylphenyl)phenyl phosphate, o-phenylphenyldicresyl phosphate, dibutyl phosphate, monobutyl phosphate, di(2-ethylhexyl) phosphate, monoisodecyl phosphate, 2-acryloyloxyethyl acid phosphate, 2-methacryloyloxyethyl acid phosphate, diphenyl-2-acryloyloxyethyl phosphate and diphenyl-2-methacryloyloxyethyl phosphate; and condensates thereof. Among these, triphenyl phosphate is preferable.

Further, the component (c) may be one or more selected from a phosphorous ester such as triphenyl phosphite, tris-nonylphenyl phosphite, tristridecyl phosphite, dibutylhydrodiene phosphite; condensates thereof; and triphenylphosphine oxide; tricresylphosphine oxide; diphenyl methanephosphonate; diethyl phenylphosphonate; and the like.

The content of the component (c) is 1 to 40 parts by weight and preferably 5 to 20 parts by weight to 100 parts by weight of the total amount of the components (a) and (b). When the content is 1 part by weight or more, sufficient flame resistance effect can be obtained, and when the content is 40 parts by weight or less, mechanical properties do not deteriorate.

The content of the organic phosphorus compound in the three-component type composition is 1 to 40 parts by weight and preferably 5 to 20 parts by weight to 100 parts by weight of the polycarbonate resin by the same reason as mentioned above.

The fluoroethylene polymer (d) used in the present invention is preferably a polymer having at least one of the following requirements (i) to (iv). It is better for the polymer to meet more of the requirements.

(i) a polymer having an number-average molecular weight of 10,000 or more and a glass transition temperature of −30° C. or higher, and preferably 100° C. or higher.

(ii) a polymer having a fluorine content of 65 to 76% by weight and preferably 70 to 76% by weight.

(iii) a polymer having an average particle diameter of 0.05 to 1000 μm and preferably 0.08 to 20 μm.

(iv) a polymer having a density of 1.2 to 2.3 g/cm$^3$.

Such a component (d) is preferably polytetrafluoroethylene, polyvinylidene fluoride, a tetrafluoroethylene-hexafluoropropylene copolymer or a ethylene-tetrafluoroethylene copolymer. Polytetrafluoroethylene is particularly preferable.

The content of the component (d) is 0.05 to 5 parts by weight and preferably 0.1 to 1 part by weight per 100 parts by weight of the total amount of the components (a) and (b). When the content of the component (d) is within the above-mentioned range, it is possible to prevent dripping based on plasticization of resin resulting from the addition of the component (c), and mechanical properties of the resulting molded articles are not damaged.

Talc, which is the component (e) used in the present invention, may contain a trace amount of aluminum oxide, calcium oxide or iron oxide besides silicic acid and magnesium oxide which are the main components. The component (e) preferably has an average particle diameter of 0.1 to 50 μm.

The content of the component (e) is 0.1 to 5 parts by weight and preferably 0.5 to 2 parts by weight to 100 parts by weight of the total amount of the components (a) and (b). When the content is 0.1 part by weight or more, it is possible to improve the resistance against hydrolysis and flame resistance of the resulting molded articles. When the content is 5 parts by weight or less, mechanical properties of the resulting molded particles are not also damaged.

The content of the talc in the three-component type composition is 0.1 to 5 parts by weight and preferably 0.5 to 2 parts by weight to 100 parts by weight of the polycarbonate resin for the same reasons as above.

The impact improver (f) used in the present invention is a component functioning as a solubilizing agent for the components (a) and (b) in each other. It may be one or more selected from the following (f-1) to (f-4).

(f-1): A copolymer of an aromatic vinyl compound and a conjugated diene compound, or a hydrogenated product thereof.

As the aromatic vinyl compound, at least one selected from styrene, -methylstyrene, vinyltoluene, p-t-butylstyrene, divinylbenzene, p-methylstyrene, 1,1-diphenylstyrene and the like may be proposed. Among these, styrene is preferable. As the conjugated diene compound, at least one selected from butadiene, isoprene, 1,3-pentadiene, 2,3-dimethyl-1,3-butadiene, piperylene, 3-butyl-1,3-octadiene, phenyl-1,3-butadiene and the like may be proposed. Among these, butadiene and isoprene are preferable.

Such a component (f-1) may be SBS (a styrene-butadiene block copolymer) or the like.

(f-2): An epoxidized product of an aromatic vinyl compound and a conjugated diene compound, or a hydrogenated product thereof.

The aromatic vinyl compound and the conjugated diene compound may be the same as for the component (f-1).

Such a component (f-2) may be ESBS (an epoxidized styrene-butadiene block copolymer) or the like.

(f-3): A copolymer of an aromatic vinyl compound and a monomer polymerizable with the aromatic vinyl compound.

The aromatic vinyl compound may be the same as for the component (f-1). As the polymerizable monomer, at least one selected from alkyl esters of (meth)acrylic acids (C1 to C10), i.e. methyl, ethyl or butyl esters of (meth)acrylic acids; alkyl esters of (meth)acrylic acid having functional groups, such as 2-hydroxyethyl methacrylate, 2-hydroxypropyl methacrylate and the like; or β-ethylenic unsaturated carboxylic acids such as (meth)acrylic acid; unsaturated multivalent carboxylic acids or an anhydride thereof, such as maleic acid and maleic anhydride; polymerizable imides such as maleimide, N-methylmaleimide, and N-phenylmaleimide may be proposed.

Such a component (f-3) may be MAS (a copolymer of methyl methacrylate and styrene) or the like.

Further, the component (f-3) may be a graft copolymer resin of a polymer of the above-mentiond aromatic vinyl compound an a polymer of a (meth)acrylic ester monomer or the like.

The content of the (meth)acrylic ester copolymer in the graft copolymer resin (f-3) is preferably 50% by weight or less, and more preferably 30% by weight or less in terms of the starting monomers.

(f-4): A graft copolymer obtained by graft-polymerizing an aromatic vinyl compound and a monomer polymerizable with the aromatic vinyl compound on the body of a rubbery polymer having a glass transition point of −30° C. or lower.

The rubbery polymer having a glass transition point of −30° C. or lower may be one or more selected from a diene rubber (a low cis or high cis type butadiene rubber, isoprene rubber, styrene-butadiene rubber, and the like), ethylene-vinyl acetate rubber, acrylic rubber, ethylene-propylene rubber and the like. The aromatic vinyl compound and the monomer being polymerizable with the aromatic vinyl compound may be the same as for the component (f-3).

Such a component (f-4) may be MBS (a graft copolymer of methyl methacrylate, styrene and butadiene) or the like.

The content of the component (f) is 0.1 to 20 parts by weight and preferably 1 to 5 parts by weight to 100 parts of the total amount of the components (a) and (b) When the content of the component (f) is 0.1 parts by weight or more, it is possible to improve impact-resistance. When the content is 20 parts by weight or less, it is possible to prevent a drop in flame resistance and mechanical properties.

The polyphenylene ether resin (g) used in the present invention may be a homopolymer or a copolymer.

The homopolymer may be poly(2,6-dimethyl-1,4-phenylene)ether, poly(2-methyl-6-ethyl-1,4-phenylene)ether, poly(2,-diethyl-1,4-phenylene)ether, poly(2-ethyl-6-n-propyl-1,4-phenylene)ether, poly(2,6-di-n-propyl-1,4-phenylene)ether, poly(2-methyl-6-n-butyl-1,4-phenylene)ether, poly(2-ethyl-6-isopropyl-1,4-phenylene)ether, poly(2-methyl-6-hydroxyethyl-1,4-phenylene)ether, or the like. Among these, poly(2,6-dimethyl-1,4-phenylene)ether is preferable.

The copolymer has a phenylene ether structure as a main structural unit, and may be a copolymer of 2,6-dimethylphenol and 2,3,6-trimethylphenol, a copolymer of 2,6-dimethylphenol and o-cresol, a copolymer of 2,6-dimethylphenol, 2,3,6-trimethylphenol and o-cresol, or the like.

The content of the component (g) is 0.1 to 20 parts by weight and preferably 0.5 to 5 parts by weight to 100 parts of the total amount of the components (a) and (b). When the content of the component (g) is 0.1 parts by weight or more, it is possible to improve surface impact strength. When the content is 20 parts by weight or less, it is possible to prevent a drop in impact strength.

Further, the fluidity improver may be blended with the thermoplastic resin composition of the present invention. For example, a copolymer of an aromatic vinyl monomer (styrene or the like) and a (meth)acrylic acid ester monomer (alkyl esters of acrylic acids (C1 to C8) such as methyl (meth)acrylate, butyl (meth)acrylate and the like), aliphatic hydrocarbons (liquid paraffin, paraffin, microcrystalline wax, polyolefine wax, and partially-oxidized products thereof), higher aliphatic acid (saturated fatty acids such as caproic acid, palmitic acid and stearic acid, and unsaturated fatty acids such as recinoleic acid), esters of higher aliphatic acid (triglyceride stearate and the like), and higher alcohols (stearyl alcohol and the like) may be blended to the composition.

Further, the following may be blended with the thermoplastic resin composition of the present invention: a stabilizer (an antioxidant, an UV absorbents, a light stabilizer, a heat stabilizer and the like), a reinforcing agent, an antistatic additive, a lubricant, a mold releasing agent, a filler, a hue improver, a colorant, a plasticizer or the like.

In the thermoplastic resin composition of the present invention, the reduction ratio of the number-average molecular weight (Mn) of the polycarbonate resin (a) after the molded article (test piece No. 1 (JIS K7113)) is allowed to stand in an atmosphere of 40° C. and 90% RH for 1000 hr calculated by the following equation is preferably 0 to 20% and more preferably 0 to 10%.

$$\text{Mn reduction } (\%) = \frac{\text{Mn before exposure to steam} - \text{Mn after exposure to steam}}{\text{Mn before exposure to steam}} \times 100$$

The thermoplastic resin composition of the present invention can be applied to materials for parts of OA equipment, communication equipment, housing for electric appliances, chassis and the like, and materials for parts of automobiles and the like.

EXAMPLES

Hereinafter, Examples are given to describe the present invention more in detail. However, the present invention is not limited thereto. The methods for evaluation shown in Tables 1 and 2 are as follows.

(1) Impact Strength (kg·cm/cm, J/m)

A notched test piece having a thickness of ¼ inch was used to evaluate its impact strength by an index of Notch Izod impact strength.

(2) Resistance against Hydrolysis

① Test piece No. 1 (JIS K7113) was allowed to stand in an atmosphere of 40° C. and 90% RH for 1000 hr, and subsequently the number-average molecular weight (Mn) of polycarbonate resin was measured under the following conditions to determine its Mn reduction ratio.

(Conditions for the Molecular Weight Measurement)

Machine: manufactured by Toso Corp. GPC 8000 type

Column: manufactured by Toso Corp. K-802, 804 and 806

Solvent: chloroform

Temperature: 40° C.

Flow rate: 0.8 ml/min

② A test piece (with a notch) having a thickness of ¼ inch was allowed to stand in an atmosphere of 40° C. and 90% RH for 1000 hr, and then its Izod impact strength measured to evaluate its resistance against hydrolysis.

(3) Surface Impact Strength (Falling Weight Impact Strength, kgf·cm, J)

A jig having a weight of 4 kg and a punch diameter of 20R and a plate test piece having a thickness of 2 mm were used to evaluate its surface impact strength.

(4) Thermal Deformation Temperature (Deflection Temperature under Load)

A load of 18.56 kg/cm$^2$ was applied to a test piece having a thickness of ¼ inch to evaluate its thermal deformation temperature.

(5) Flame Resistance (UL94)

A test piece (bar sample) having a thickness of 1/16 inch was used to evaluate its flame resistance according to a vertical flame resistance test (94V-0) defined in UL94 of the American UL standard.

Details of the respective components shown in Tables 1 and 2 are as follows:

(a) Polycarbonate resin

PC: Bisphenol A polycarbonate resin (produced by Idemitsu Petrochemical Co., Ltd., Toughlon FN1900A (trade name), and number-average molecular weight: 20,000)

(b) Styrene resin

Rubber-modified styrene resin 1: Daicel styrol R69 (trade name) produced by Daicel Chemical Industries, Ltd.

Rubber-modified styrene resin 2: Cebian V-520 (trade name) produced by Daicel Chemical Industries, Ltd.

(c) organic phosphorus compound
TPP: triphenyl phosphate (produced by Daihachi Chemical Industry Company)
CR733S: Condensed phosphate ester(produced by Daihachi Chemical Industry Company)
PX-200: Condensed phosphate ester(produced by Daihachi Chemical Industry Company)

(d) Fluoroethylene polymer
PTFE: polytetrafluoroethylene (Teflon 6-J (trade name) produced by Dupont-Mitusi Fluorochemicals Co., Ltd.)

(e) Talc: Micron white 5000S (trade name) produced by Daicel Chemical Industries, Ltd.

(f) Impact improver
(f-2): epoxidized block copolymer (Epofriend A1020 (trade name) produced by Daicel Chemical Industries, Ltd.)
(f-3)
MAS-1: Cebian MAS 10 (methyl methacrylate/styrene=20/80 produced by Daicel Chemical Industries, Ltd.)
MAS-2: Cebian MAS 30 (methyl methacrylate/styrene=60/40 produced by Daicel Chemical Industries, Ltd.)
(f-4): graft copolymer of methyl methacrylate, styrene and butadiene (MBS 68K1F (trade name) produced by Nippon Synthetic Resin Co., Ltd.)

(g) Polyphenylene ether resin
PPE: polyphenylene ether (BLENDEX HPP820 (trade name) produced by GE Speciality Chem. Inc.)

Examples 1 to 15 and Comparative Examples 1 to 6

Respective components shown in Tables 1 and 2 were blended with a tumbler blender and then melted and kneaded in an extruder to obtain each of the resin compositions in a pellet form. The units of (a) and (b) is % by weight, and the units of the others is part(s) by weight. Next, an injection molder (cylinder temperature: 250° C. and mold temperature: 60° C.) was used to prepare test pieces. Respective items were then measured and evaluated. The results are shown in Tables 1 and 2.

As it is evident from the comparison of the impact strength and the resistance against hydrolysis, even if the molded articles obtained from the compositions of Examples 1 to 15 containing an appropriate amount of talc were allowed to stand in an atmosphere of at 40° C. and 90% RH for 1000 hr, their molecular weight dropped slightly and their Izod impact strength hardly dropped. On the other hand, in the molded articles obtained from the compositions of Comparative Examples 1 to 6 containing no talc, their molecular weight and Izod impact strength dropped remarkably. Thus, they are bad as commercial products.

In the compositions of Examples 1 to 15, the amounts of the organic phosphorus compounds used were reduced as compared with Comparative Examples 1 to 6, so that their thermal deformation temperature did not drop, and further, the flame resistance did not drop either.

The thermoplastic resin composition of the present invention is excellent in hydrolysis resistance and further in flame resistance, and also has a high thermal deformation temperature.

TABLE 1

| | | | Examples | | | | | | | |
|---|---|---|---|---|---|---|---|---|---|---|
| | | | 1 | 2 | 3 | 4 | 5 | 6 | 7 | 8 |
| (a) | PC | | 80 | 80 | 80 | 80 | 80 | 80 | 80 | 80 |
| (b) | Rubber-modified styrene resin 1 | | 20 | 20 | | 20 | 20 | 20 | 20 | 20 |
| | Rubber-modified styrene resin 2 | | | | 20 | | | | | |
| (c) | TPP | | 9 | 9 | 8 | | | 9 | 9 | 8 |
| | CR733S | | | | | 11 | | | | |
| | PX-200 | | | | | | 13 | | | |
| (d) | PTFE | | 0.3 | 0.3 | 0.3 | 0.3 | 0.3 | 0.3 | 0.3 | 0.3 |
| (e) | talc | | 1 | 2 | 1 | 2 | 2 | 2 | 2 | 2 |
| (f) | (f-2) | | | | | | | 2 | | |
| | (f-4) | | | | | | | | 2 | |
| (g) | PPE | | | | | | | | | 1 |
| | Izod impact strength (kg · cm/cm) | | 12 | 10 | 31 | 9 | 8 | 21 | 18 | 10 |
| Resistance against hydrolysis | Mn after exposure to steam | | 19000 | 19000 | 19000 | 18500 | 19500 | 19000 | 19000 | 19000 |
| | Mn reduction (%) | | 5 | 5 | 5 | 7.5 | 2.5 | 5 | 5 | 5 |
| | Falling weight impact strength (kgf · cm) | | 150 | 140 | 260 | 110 | 110 | 230 | 210 | 300 |
| | Thermal deformation temp. (° C.) | | 92 | 92 | 95 | 94 | 95 | 91 | 81 | 94 |
| | Flame resistsnce (UL 94) | | V-0 | V-0 | V-0 | V-0 | V-0 | V-0 | V-0 | V-0 |

| | | | Comparative Examples | | | | | |
|---|---|---|---|---|---|---|---|---|
| | | | 1 | 2 | 3 | 4 | 5 | 6 |
| (a) | PC | | 80 | 80 | 80 | 80 | 80 | 80 |
| (b) | Rubber-modified styrene resin 1 | | 20 | 20 | 20 | 20 | 20 | |
| | Rubber-modified styrene resin 2 | | | | | | | 20 |

TABLE 1-continued

|     |     |     |     |     |     |     |     |
|-----|-----|-----|-----|-----|-----|-----|-----|
| (c) | TPP | 9 | 13 |  |  |  | 8 |
|  | CR733S |  |  | 11 |  | 14 |  |
|  | PX-200 |  |  |  | 13 |  |  |
| (d) | PTFE | 0.3 | 0.3 | 0.3 | 0.3 | 0.3 | 0.3 |
| (e) | talc |  |  |  |  |  |  |
| (f) | (f-2) |  |  |  |  |  |  |
|  | (f-4) |  |  |  |  |  |  |
| (g) | PPE |  |  |  |  |  |  |
|  | Izod impact strength (kg · cm/cm) | 13 | 9 | 10 | 10 | 7 | 35 |
| Resistance against hydrolysis | Mn after exposure to steam | 16500 | 15000 | 14000 | 16000 | 14000 | 18000 |
|  | Mn reduction (%) | 17.5 | 25 | 30 | 20 | 30 | 20 |
|  | Falling weight impact strength (kgf · cm) | 140 | 110 | 120 | 110 | 90 | 290 |
|  | Thermal deformation temp. (° C.) | 91 | 78 | 93 | 95 | 83 | 95 |
|  | Flame resistsnce (UL 94) | Spec. Out | V-0 | Spec. Out | Spec. Out | V-0 | Spec. Out |

TABLE 2

|  |  | Examples |  |  |  |  |  |  |
|---|---|---|---|---|---|---|---|---|
|  |  | 9 | 10 | 11 | 12 | 13 | 14 | 15 |
| (a) | PC | 80 | 80 | 80 | 80 | 80 | 80 | 80 |
| (b) | Rubber-modified styrene resin 1 | 20 | 20 | 20 |  |  |  |  |
|  | Rubber-modified styrene resin 2 |  |  |  | 20 | 20 | 20 | 20 |
| (c) | TPP | 9 | 9 | 9 | 9 | 9 | 9 | 9 |
| (d) | PTFE | 0.3 | 0.3 | 0.3 | 0.3 | 0.3 | 0.3 | 0.3 |
| (f-3) | MAS-1 | 1 |  | 2 |  | 1 |  | 2 |
|  | MAS-2 |  | 1 |  |  |  | 1 |  |
| (f-4) | MBS | 1 | 1 |  | 2 | 1 | 1 |  |
| (e) | Talc | 2 | 2 | 2 | 2 | 2 | 2 | 2 |
| Izod impact strength (J/m) |  | 392 | 294 | 147 | 343 | 490 | 392 | 343 |
| Izod impact strength (kg · cm/cm) |  | 40 | 30 | 15 | 35 | 50 | 40 | 35 |
| Resistance against hydrolysis | Mn after exposure to steam | 19000 | 19000 | 19000 | 18500 | 19500 | 18500 | 18500 |
|  | Mn reduction (%) | 5 | 5 | 5 | 7.5 | 7.5 | 7.5 | 7.5 |
| Falling weight impact strength (thickness of 2mm) (J) |  | 25.5 | 22.4 | 18.4 | 28.6 | 31.6 | 30.6 | 27.6 |
| Falling weight impact strength (thickness of 2mm) (kgf · cm) |  | 250 | 220 | 180 | 280 | 310 | 300 | 270 |
| Thermal deformation temp. (° C.) |  | 89 | 90 | 89 | 96 | 95 | 95 | 94 |
| Flame resistance (UL 94) |  | V-0 | V-0 | V-0 | V-0 | V-0 | V-0 | V-0 |

What is claimed is:

1. A thermoplastic resin composition comprising 100 parts by weight of a mixture of 30 to 95% by weight of (a) a polycarbonate resin and 5 to 70% by weight of (b) a styrene resin, 1 to 40 parts by weight of (c) an organic phosphorus compound, 0.1 to 5 parts by weight of (e) talc and 0.05 to 5 parts by weight of a polymer of (d) a fluoroethylene, with the proviso that if a rubber-modified styrene resin is contained in said thermoplastic resin composition, it is selected from the group consisting of a styrene copolymer formed by polybutadiene copolymerized with styrene, acrylic rubber copolymerized with acrylonitrile and styrene, polyethylene chloride copolymerized with acrylonitrile and styrene, EPDM copolymerized with acrylonitrile and styrene, ethylene-vinyl acetate copolymer copolymerized with acrylonitrile and styrene, and polybutadiene copolymerized with methyl methacrylate and styrene.

2. The composition as claimed in claim 1, which further comprises 0.1 to 20 parts by weight of (f) at least one member selected from the group consisting of (f-1) to (f-4):
(f-1) a copolymer of an aromatic vinyl compound and a conjugated diene compound, or a hydrogenated product of the copolymer;
(f-2) an epoxidized product of a copolymer of an aromatic vinyl compound and a conjugated diene compound, or a hydrogenated product of the epoxidized product;
(f-3) a copolymer of an aromatic vinyl compound and a (meth)acrylic ester monomer; and
(f-4) a graft copolymer obtained by graft-polymerizing an aromatic vinyl compound and a (meth)acrylic ester monomer on the body of a rubber polymer having a glass transition point of −30° C. or lower.

3. The composition as claimed in claim 2, in which the impact improver comprises (f-3) and (f-4), and (f-3) is a graft copolymer.

4. The composition as claimed in claim 2, in which (f-3) contains 50% by weight or less of the (meth)acrylic ester monomer in terms of starting monomers.

5. The composition as claimed in claim 2, which further comprises 0.1 to 20 parts by weight of (g) polyphenylene ether resin.

6. The composition as claimed in claim 2, wherein said composition is contained in a molded article thereof and has an excellent resistance to hydrolysis.

7. The composition as claimed in claim 6, in which the number-average molecular weight of component (a) is reduced by 0 to 20% when the molded article has been allowed to stand at 40° C. and 90% RH for 1000 hrs.

8. The composition as claimed in claim 3, in which (f-3) is a copolymer of methyl methacrylate and styrene and (f-4) is a graft copolymer of methyl methacrylate, styrene and butadiene.

* * * * *

UNITED STATES PATENT AND TRADEMARK OFFICE
CERTIFICATE OF CORRECTION

PATENT NO. : 6,531,534 B1 Page 1 of 1
DATED : March 11, 2003
INVENTOR(S) : Masahiro Katayama It is certified that error appears in the above-identified patent and that said Letters Patent is hereby corrected as shown below:

<u>Title page</u>,
Item [22], please change from "PCT Filed: February 18, 2000" to
-- PCT Filed: January 27, 2000 --.

Signed and Sealed this

Seventeenth Day of February, 2004

JON W. DUDAS
*Acting Director of the United States Patent and Trademark Office*